US007364160B2

(12) United States Patent
Seelig et al.

(10) Patent No.: US 7,364,160 B2
(45) **Date of Patent: *Apr. 29, 2008**

(54) GAMING DEVICE BASE

(75) Inventors: Jerald C. Seelig, Absecon, NJ (US); Mac Seelig, Absecon, NJ (US); Jack McNamara, Mount Laurel, NJ (US); Michael Kobryn, Philadelphia, PA (US)

(73) Assignee: Atlantic City Coin & Slot Service Company, Inc., NJ (US)

( * ) Notice: Subject to any disclaimer, the term of this patent is extended or adjusted under 35 U.S.C. 154(b) by 309 days.

This patent is subject to a terminal disclaimer.

(21) Appl. No.: 11/012,986

(22) Filed: Dec. 14, 2004

(65) Prior Publication Data

US 2005/0096137 A1 May 5, 2005

Related U.S. Application Data

(63) Continuation of application No. 10/245,628, filed on Sep. 16, 2002, now Pat. No. 6,880,825.

(51) Int. Cl.
*A63F 13/08* (2006.01)
*G07F 17/34* (2006.01)

(52) U.S. Cl. ..................... 273/143 R; 273/309; 463/46

(58) Field of Classification Search ............ 273/143 R, 273/309, 138.1, 138.2; 463/20, 46
See application file for complete search history.

(56) References Cited

U.S. PATENT DOCUMENTS

| | | | |
|---|---|---|---|
| 4,678,234 | A | 7/1987 | Wilson |
| 4,991,908 | A | 2/1991 | Krechel |
| 5,419,618 | A | 5/1995 | Hatcher |
| D367,968 | S | 3/1996 | Hatcher |
| 5,577,806 | A | 11/1996 | Ugalde |
| 5,584,535 | A | 12/1996 | Jacobson et al. |

(Continued)

FOREIGN PATENT DOCUMENTS

| | | | |
|---|---|---|---|
| JP | 6178863 | * | 6/1994 |

(Continued)

OTHER PUBLICATIONS

InterGaming, Jan. 2001, p. 21. InterGame Ltd, Oldham, England (Full color).

(Continued)

*Primary Examiner*—Benjamin H Layno
(74) *Attorney, Agent, or Firm*—Ian F. Burns & Associates, PC

(57) ABSTRACT

A gaming device base having a front surface that allows players to extend their legs. In the preferred embodiment, the gaming device base has a horizontal support member having a substantially flat surface to support at least one gaming device and at least one edge. The gaming device base has at least one door positioned beneath the horizontal support member. The door may be moved from an open to a closed position. In the closed position, the door is positioned behind the edge of the horizontal support member. The door has at least one angled portion, which is an acute angle measured from a vertical plane. Players sitting in front of the edge of the horizontal support member may stretch or extend their legs behind the edge of the horizontal support member.

18 Claims, 5 Drawing Sheets

U.S. PATENT DOCUMENTS

2004/0004112 A1 * 1/2004 Petruccelli .................. 235/375

FOREIGN PATENT DOCUMENTS

JP 11128490 * 5/1999

OTHER PUBLICATIONS

InterGaming, Mar. 2001, InterGame Ltd, Oldham, England (Full color).

InterGaming, Apr. 2001, InterGame Ltd, Oldham, England (Full color).

InterGaming, Jul. 2001, InterGame Ltd, Oldham, England (Full color).

InterGaming, Aug. 2001, InterGame Ltd, Oldham, England (Full color).

InterGaming, Oct. 2001, InterGame Ltd, Oldham, England (Full color).

* cited by examiner

FIG. 6
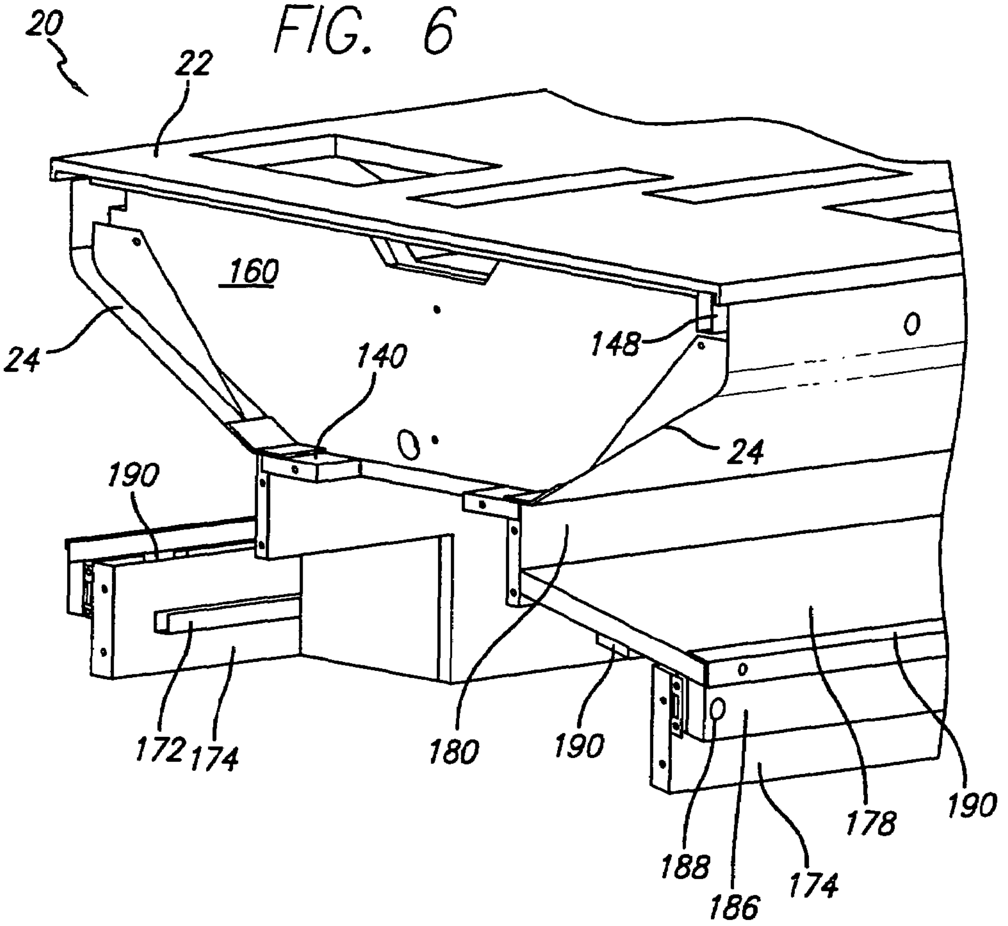
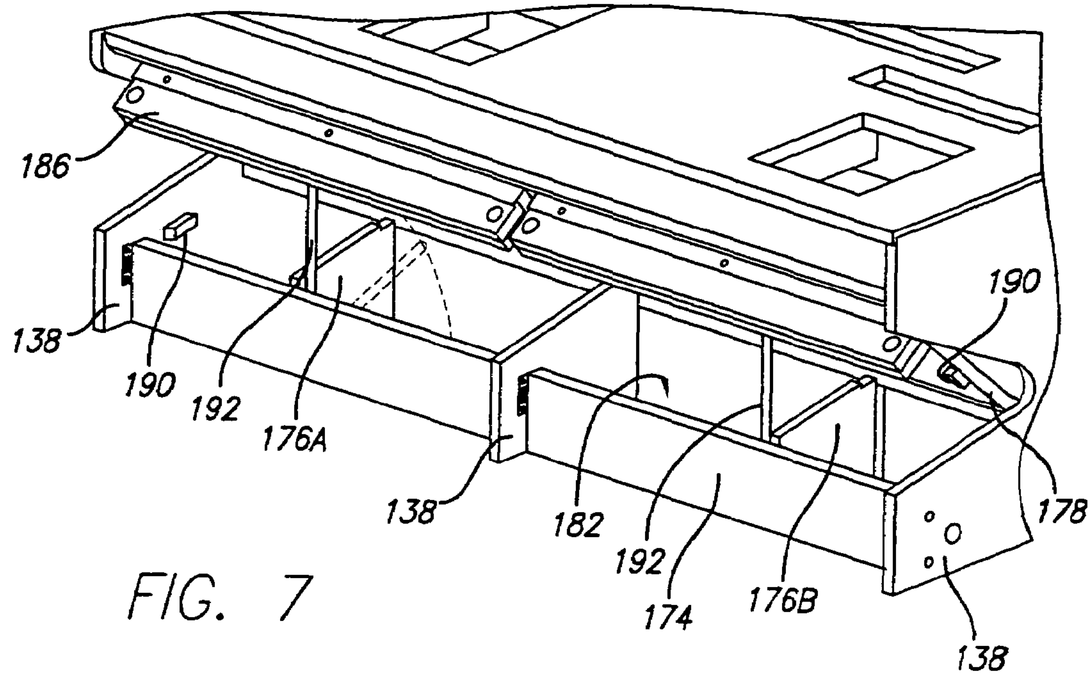
FIG. 7

GAMING DEVICE BASE

RELATED APPLICATIONS

This continuation application relates to and incorporates the parent application Ser. No. 10/245,628 and claims by priority the filing date of said parent application.

FIELD OF INVENTION

The present invention relates to gaming device bases. More particularly, the present invention relates to bases used to support gaming devices in casinos and other operating locations.

BACKGROUND

Gaming device bases or stands are well known in the art and they are widely used to support gaming devices in casinos and other gaming establishments. Gaming device bases generally support one or more gaming devices above a floor where the gaming device may be more easily seen, played, and serviced.

Gaming device bases may be configured to accommodate varying numbers of gaming devices. For example, gaming device bases may be configured to support one, two, four, or a more of gaming devices. Gaming device bases may further be positioned in a variety of configuration. For example, gaming device bases may be configured to accommodate gaming devices positioned back-to-back or side-by-side.

An example of a gaming device base is disclosed in Jarrett (U.S. Pat. No. Des. 354,637). One of the problems associated with gaming device bases, such as the one disclosed in Jarrett, is that they commonly have flat front surfaces that prevent players' from extending their legs. It has been found that many players are more comfortable if they can extend their legs in front of them, even a small amount, rather than keeping their legs tightly bent. When players are more comfortable, they tend to have a more enjoyable experience and they tend to play longer.

Another problem with the gaming device bases, such as the one disclosed in Jarrett, is that the top surface does not have sufficient strength to support the weight of a gaming device overtime. Thus, the top surface is susceptible to bending, cracking, and warping.

Another gaming device base is disclosed in Ward (U.S. Pat. No. 6,042,115). The gaming device base is designed to support modified slot machines that have reduced coin hopper size, reduced power supply size, and circuit board positioned at an angle. (See also U.S. design Pat. Nos. 399,889 and 409,857 issued to the same inventor). Ward discloses that the combination of the slot cabinet and the modified slot machine is designed to reduce the amount of floor space occupied by gaming devices, which is especially valuable in casino environments.

One problem with Ward's slot cabinet is that it requires complicated modifications to the gaming device before the slot cabinet can effectively support the gaming device. For example, the gaming device has to be modified by reducing the coin hopper size, reducing the power supply size, and positioning the circuit board at an angle. Next, while Ward's slot cabinet allows players to sit closer to the gaming device, the front wall blocks the players' legs and does not allow players to extend or stretch their legs. There is a long felt and unmet need for a gaming device base that has a front surface that does not block the players' legs and that allows players to stretch their legs.

Ward's slot cabinet further does not include any footrests. While the space between the bottom of the front wall and the floor allows players to insert their toes to be closer to the gaming machine, there are no structures that elevate players' feet and allow players to rest their feet.

Another gaming device base is disclosed Rowe et al. (U.S. Pat. No. 6,116,597). The gaming device base has a foot rail positioned in front of the gaming device base. The foot rail disclosed may be fixed or foldable. One problem with Rowe et al.'s foot rail is that the rail is made of a tube or a rod and is not supported by the floor. A footrest supported by the floor is desired because it is more stable and durable than a rail merely mounted on the front wall of the gaming device base. Another problem with the foot rail disclosed in Rowe et al. is that, the rail does not support the entire surface area of the players' feet. As a result, players' feet may slide away from the foot rail. Players are likely to exert extra effort to keep their feet on the rail. A footrest having the ability to support a substantial portion of players' foot is therefore desired.

Gaming device bases are known to store coins. For example, slot machines typically have hoppers that store and dispense coins. Hoppers are typically limited in size and regularly become full. When the hoppers are filled with coins, coins are diverted to an overflow bucket disposed inside the gaming device bases. Coin passages are located on the bottom of slot machines. Coins from slot machines pass through the coin passages and are received by coin buckets disposed in the slot bases.

A gaming device base that stores coins is disclosed Salour et al. (U.S. Pat. Nos. 5,876,285 and 6,146,274). The gaming device base has a hopper for storing coins positioned inside the cabinet and a mechanism for emptying the hoppers. Coins from the gaming device drop through a coin passage to the hopper. The hopper has a chute and chute door, which may be opened and closed. During coin collection and counting, a casino employee would open the slot cabinet door, close the chute door, and move the chute toward him. The employee may then position a bucket underneath the chute and open the chute door to discharge the coins to the bucket thereby emptying the hopper.

One problem with the gaming device base in Salour et al. that it requires employees, who may regularly remove the coin buckets for weighing and counting of coins, to lift coin buckets off the floor. Employees have to bend and lift the coin buckets, which increases the risk of back injuries. There is a long felt and unmet need for a gaming device base with coin buckets or receptacles positioned on top of the gaming device base or off the floor.

Gaming device bases are further known to store electrical wires. Examples of electrical wires include communication wires, power supply wires, wires for hoppers, wires for electronic locks, and wires for the sensors of coin buckets. Gaming operators desire to hide the wires as discreetly as possible for aesthetic reasons as well as to keep their patrons from tripping over the wires. Gaming operators conventionally hide the electrical wires by running the wires across the slot base and storing the wires inside the slot base. One problem with this technique is that electrical wires, which are not isolated from the vicinity of the coin path as the coins move from the gaming machine to the base, deflect coins coming from gaming device thereby causing coins to be lost. A gaming device base that isolates the electrical wires from the vicinity of the coin path is therefore desired.

SUMMARY

The applicant has therefore provided a gaming device base having a front surface that allows players to stretch their legs. In the preferred embodiment, the gaming device base has a horizontal support member having a substantially flat surface to support at least one gaming device and at least one edge. The gaming device base has at least one door positioned beneath the horizontal support member. The door may be moved from an open to a closed position. In the closed position, the door is positioned behind the edge of the horizontal support member. The door has at least one angled portion, which is an acute angle measured from a vertical plane. Players sitting in front of the edge of the horizontal support member may stretch their legs behind the edge of the horizontal support member.

The applicants have also provided a gaming device base having a footrest supported by a floor and that is capable of supporting a substantial portion of players' feet. In the preferred embodiment, the footrest has a footrest plate resting on footrest plate support members, which preferably rest on the floor.

Next, the applicants have provided a gaming device base having a horizontal support member able to withstand the weight of a gaming machine positioned thereon overtime. The horizontal support member is preferably made resilient by a beam positioned underneath the horizontal support member.

The applicants have further provided a gaming device base that discreetly stores electrical wires and isolates electrical wires from the path of the coins as the coins are moved from a gaming machine to the base. The gaming device base has a wire chase adapted to receive electrical wires of a gaming device machine and positioned underneath the horizontal support member. Most preferably, the gaming device base further has a vertical wire partition adjacent to a vertical member of the support structure. The vertical wire partition and the vertical member define a gap in between them. Electrical wires run through wire chase then through the gap. Most preferably, at least one bottom wire chase is provided to receive the wires coming from the gap. Vertical members of the support structure further define at least one passage where wires may enter or exit from the gaming device base.

Additional features of the invention will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Certain embodiments of the present invention are shown in the accompanying drawings where:

FIG. 6 is substantially a cross-sectional view of the gaming device base of FIG. 1 taken from line 6 indicated on FIG. 1.

FIG. 7 is substantially a closer view of a portion of FIG. 1 showing the components of the footrest and its respective attachments.

DETAILED DESCRIPTION OF AT LEAST ONE EMBODIMENT

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

The present invention comprises a gaming device base, generally indicated by reference number 20. The terms "base," "support device," "slot base," and "gaming device base" are used interchangeably to refer to a device used for supporting a gaming device. "Gaming devices" is a term used to refer to gambling machines and arcade machines. Examples of gambling machines are slot machines with reel or video displays, gaming tables, and machines typically found in casinos. Examples of arcade machines are video games and machines typically found in arcade establishments.

The terms "coin bin," "receptacle," and "coin bucket" are used interchangeably to refer to a receptacle adapted to receive coins, currencies, tickets, stubs, vouchers, or any other items used as a wager or a prize. The term "coin" is used interchangeably with currencies, tickets, stubs, vouchers, or any other items used as a wager or a prize. As used herein, the term "door" refers to any barrier by which an entry is closed and opened. Alternatively, the term "door" refers to an immovable wall used to enclose the confines of the gaming device base.

Figure 1:
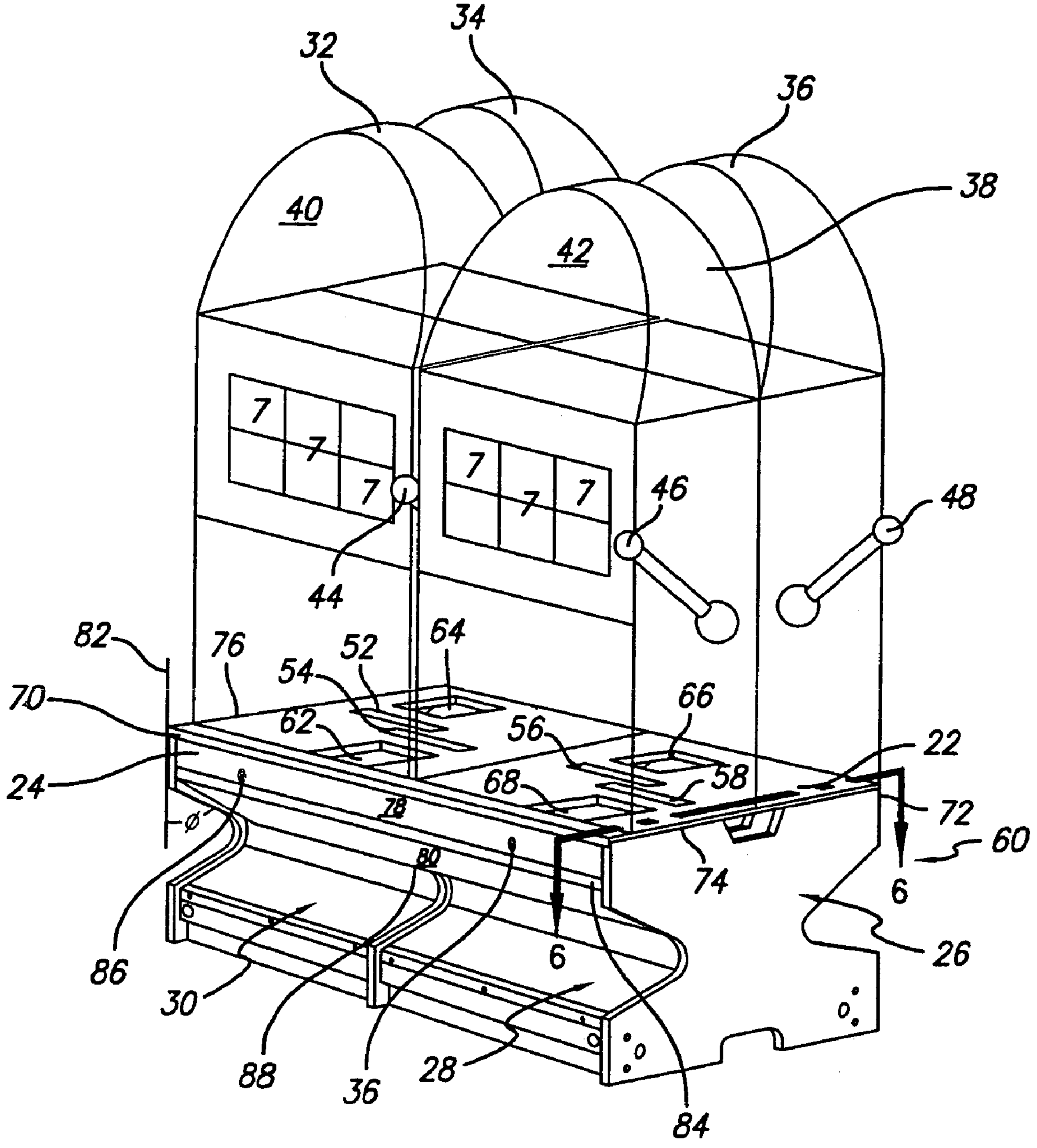
FIG. 1 is substantially a perspective view of an embodiment the gaming device base wherein the gaming device base accommodates four gaming devices, two gaming devices being positioned on each side of the gaming device base.

Referring now to FIG. 1, an embodiment of a gaming device base 20 is shown. Gaming device base 20 preferably has a horizontal support member 22, a door 24, a support structure 26, and footrests 28 and 30. Horizontal support member 22 preferably has a flat surface to support gaming devices 32, 34, 36, and 38. Horizontal support member 22 preferably has a front edge 70, a back edge 72, and side edges 74 and 76. A player may sit in front of front edge 70 to play gaming device 32. Another player may sit in front of back edge 72 to play gaming device 36. Back edge 72 may also be positioned adjacent to a wall (not shown). Side edge 74 may be positioned adjacent to another gaming device base (not shown). Horizontal support member 22 most preferably has a rectangle shape, but other shapes, such as square, triangle, or circle, may be employed. Gaming devices 32, 34, 36, and 38 may be positioned on top of horizontal support member 22.

Horizontal support member 22 is preferably configured to accommodate a plurality of gaming devices 32, 34, 36, and 38. Of course, horizontal support member 22 may be configured to accommodate one or various numbers of gaming devices. Gaming devices 32 and 34 may be positioned back-to-back, and so may gaming devices 36 and 38. Gaming devices 32 and 38 may be positioned side-by-side, and so may gaming devices 36 and 34. Of course, horizontal support member 22 may be configured to accommodate gaming devices in varying positions, such as back-to-back, side-by-side, and in series.

Each gaming device 32, 34, 36, and 38 may have a coin acceptor (not shown), a coin tray (not shown), bonus display 40 and 42, a handle 44, 46, and 48, a button (not shown), a hopper (not shown), and a power supply (not shown). The power supply may have wires (not shown) that are connected to a power outlet located on a floor (not shown).

Horizontal support member 22 may define wire passages 52, 54, 56, and 58. Wire passages 52, 54, 56, and 58 allow electrical wires, such as power supply wires, to be hidden within gaming device base 20. At least one wire passage 52, 54, 56, or 58 may be disposed on horizontal support member 22 for every space allocated on horizontal support member for gaming device 32, 34, 36, and 38. Wire passages 52 and 54 and wire passages 56 and 58 are preferably offset relative to each other on horizontal support member 22 to isolate wires of each gaming device 32, 34, 36, and 38. Electrical wires of gaming devices 32, 54, 34, and 38 may run to the floor through wire passages 54, 52, 58, and 56, respectively.

Horizontal support member 22 may further define coin passages 62, 64, 66, and 68. When hopper (not shown) positioned inside a gaming device 32, 34, 36, or 38 is filled with coins, coins fall from gaming device 32, 34, 36, or 38 to the confines of gaming device base 20 through coin passages 62, 64, 66, and 68. Preferably, at least one coin passage is provided for each gaming device supported on horizontal support member. Coin passages 62 and 64 and coin passages 66 and 68 are preferably offset relative to each other on horizontal support member 22 to isolate coin paths of coins inside each gaming device 32, 34, 36, and 38 and to prevent coins coming out of gaming devices 32, 34, 36, and 38 from mixing. This is desirable in most gaming establishments to accurately account for coins produced by each gaming device.

In the preferred embodiment, gaming device base 20 has a door 24 beneath horizontal member 22. Door 24 may be moveable from a close position shown in FIG. 1 to an open position (not shown in FIG. 1). In the closed position, door 24 is most preferably positioned behind front edge 70 of horizontal support member 22. Door 24 may have a straight portion 78, which is parallel to a vertical plane 82, and an angled portion 80, which may form an acute angle (indicated in FIG. 1) measured from a vertical plane 82. When door 24 is in the closed position, door 24 allows players sitting in front of a horizontal support member edge 70 or back edge 72, to stretch their legs behind the horizontal support member edge. Intersection 84 between straight portion 78 and angled portion 80 is preferably a smoothly rounded surface for aesthetic appeal and to minimize any unpleasant contact by players. Door 24 may further have different shapes, preferably shapes that would allow players to stretch their legs underneath horizontal support member 22 or behind the horizontal support member edge.

Door 24 may have at least one lock 86 attached on straight portion 78 of door 24. In the preferred embodiment, lock 86 is a manual cylinder lock. In other embodiments, lock 86 may be made of electronic lock, bolt, or other locks known in the art. Door 24 is preferably made of galvanized steel, but may be made of other materials, such as aluminum, non-galvanized steel, wood, combination of polyvinyl chloride film on MDF core, plastic, acrylic, fiberglass, or other materials known in the art.

Figure 2:
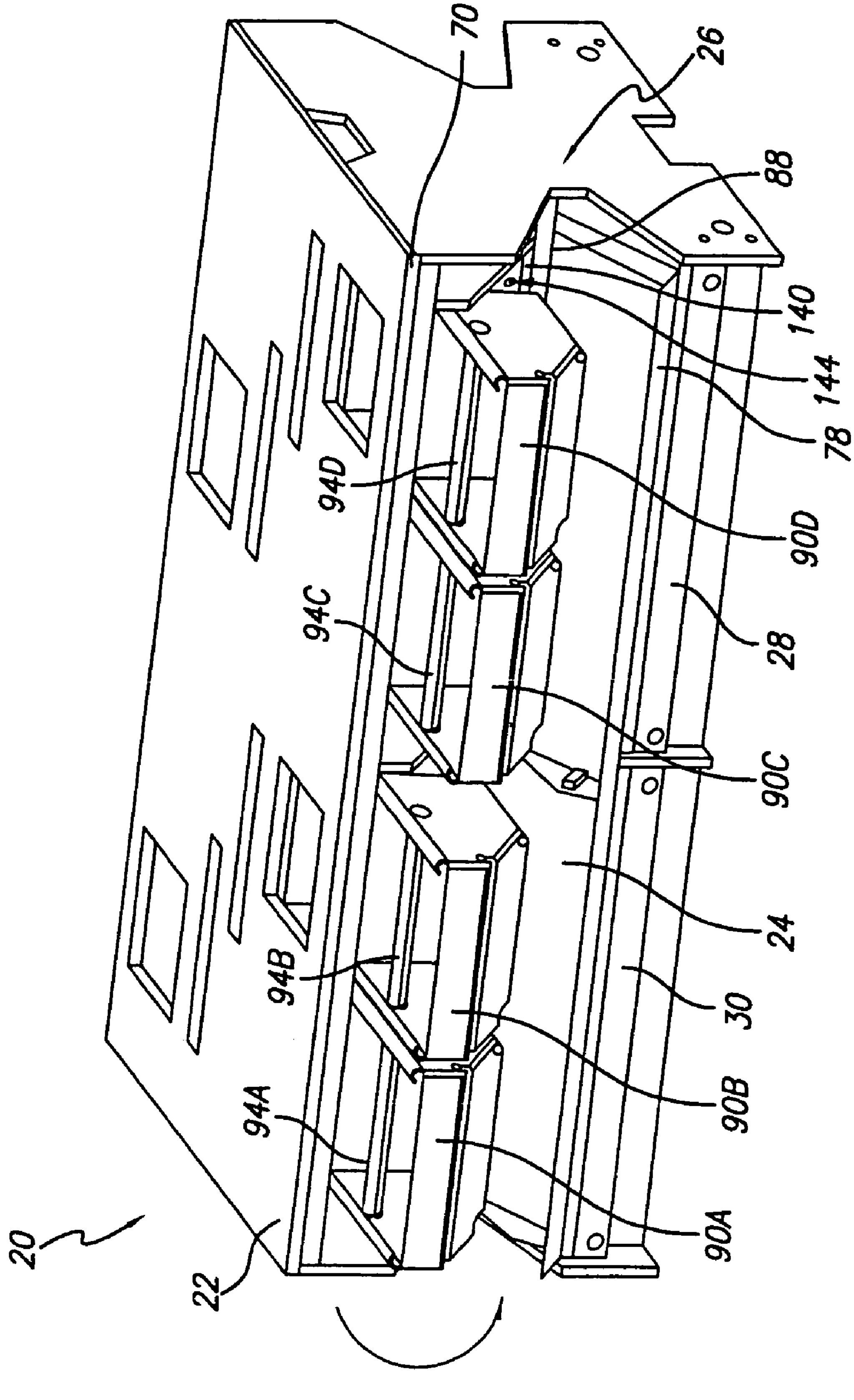
FIG. 2 is substantially a perspective view of the gaming device base of FIG. 1 showing the door in an open position and the coins bins slid forward.

Door 24 is preferably a swing door that is attached to a support structure 26 by a continuous hinge (not shown), such as a piano hinge, at door 24's hinged portion 88. Door 24 may also be rotatably attached to support structure 26 using a non-continuous hinge or other fasteners known in the art. Referring now to FIG. 2, door 24 is shown in its open position. When door 24 moves from close to open position, door 24 preferably moves in a swinging motion wherein straight portion 78 drops from a top position adjacent to horizontal support member 22 to a bottom position away from horizontal support member 22 and adjacent to footrests 28 and 30. Hinged portion 88 preferably remains attached to support structure 26. (See also arrow indicating door motion in FIG. 2). When door 24 is in an open position, a horizontal compartment 144 defined by horizontal support member 22 and horizontal partition 140 may be accessed. Horizontal compartment 144 is preferably configured to store coin bins 90A-D, which are used to receive coins coming from gaming devices through coin passages (not shown in FIG. 2) and store coins in gaming device base 20. In the most preferred embodiment, a single door 24 provides access to a plurality of coin bins 90A-D. In another embodiment (not shown), individual doors may be provided to access each coin bin.

In the most preferred embodiment, one coin bin 90A, 90B, 90C, or 90D for every gaming device 32, 34, 36, and 38 is provided. Coin bins 90A-D may be positioned side-by-side. In another embodiment (not shown), vertical coin bin partition may be provided between coin bins to further prevent coins from mixing. Most preferably, coin bins 90A-D may only be accessed from one side and most preferably the front side of gaming device base 20 or from the side of gaming device base 20 adjacent to front edge 70.

Rear door (not shown in FIG. 3) may be similar to door 24 described above. Rear door may also be permanently closed. In an alternative embodiment (not shown), no door similar to door 24 is provided at the rear of gaming device base. Rear surface of gaming device base 20 is a substantially flat surface. The flat surface is especially practical when the rear of gaming device base 20 is configured to face a wall.

Figure 3:
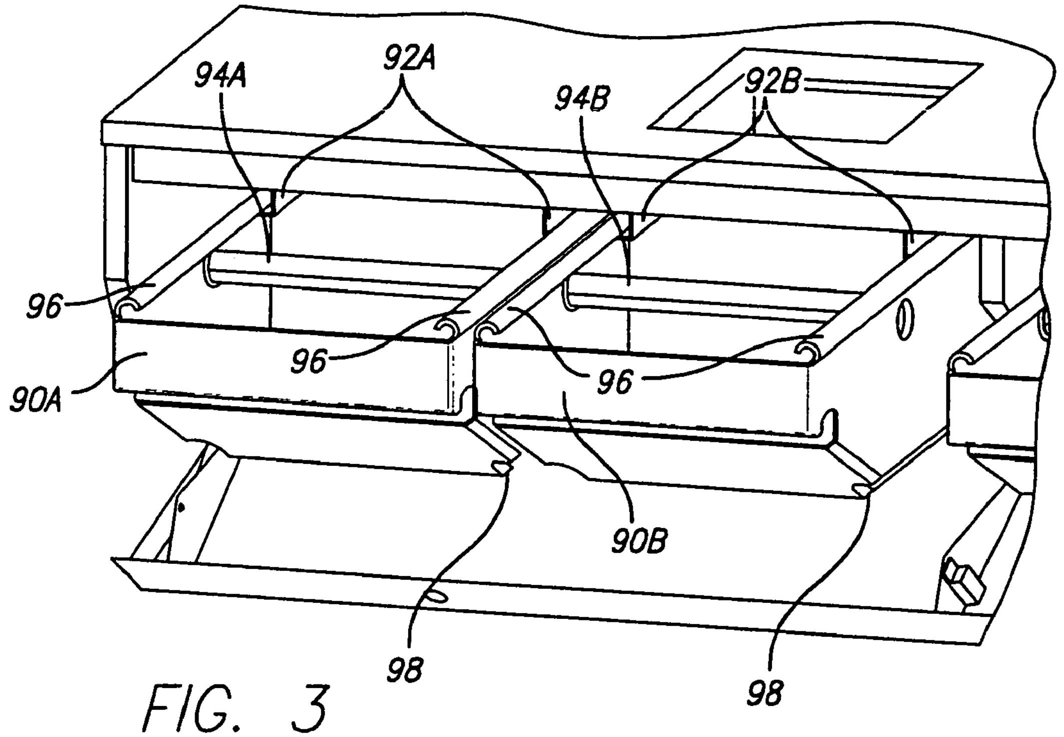
FIG. 3 is substantially a closer view of a portion of FIG. 2 showing the components of the slidable coin bins and their respective attachments.

Referring now to FIG. 3, each coin bin 90A-D preferably has a plurality of walls that define a box. The top of each coin bin 90A-D preferably comprises an opening to receive coins being dropped from corresponding gaming devices 32, 34, 36, and 38 (not shown in FIG. 3). Each coin bin 90A-D may further have a handle 94A-D disposed within the confines of each coin bin 90A-D and preferably in the middle of each coin bin or any position that would allow a user to carry the coin bin in a balanced manner. Handle 94A-D may be a rod having one end attached to a side of a coin bin and another end attached to another side of the coin bin.

Each coin bin 94A-D preferably has a pair of glides 96, one glide being attached on top of each of the coin bin's sidewalls to allow each coin bin 94A-D to be removeably attached to horizontal support member 22 and to be slid within the confines of horizontal support member 22. Each coin bin 94A-D may further be made stackable by providing a pair of recesses 98 on the bottom of each coin bin, so that when a coin bin is positioned on top of another, the pair of glides 96 of the bottom coin bin may be accommodated by pair of recesses 98 of the top coin bin. Each coin bin 94A-D is preferably made of molded polypropylene. Of course, coins bins 94A-D may be made using other materials known in the art, such as metal, wood, composites, or other polymers.

Figure 4:
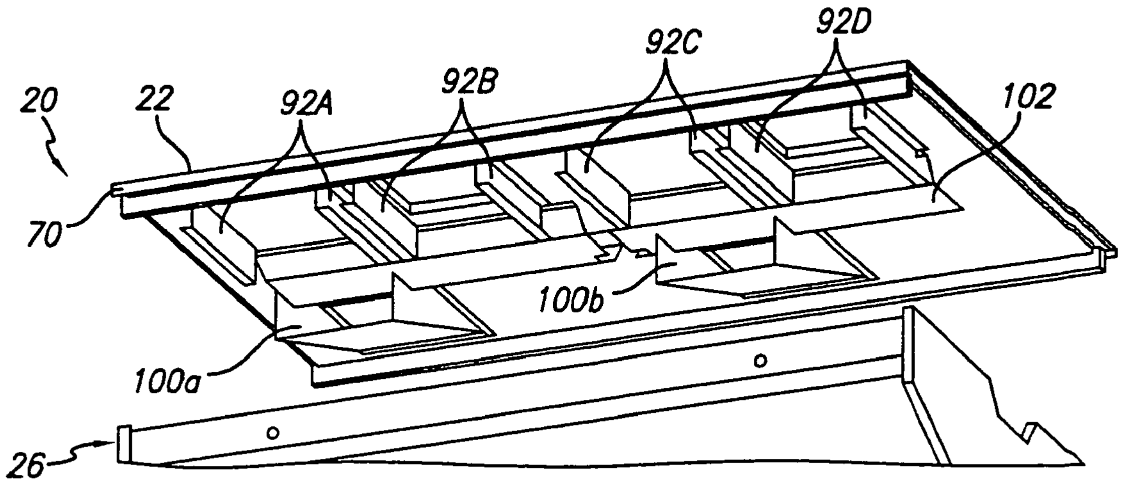
FIG. 4 is substantially a view of the underside of the horizontal support member of the gaming device base of FIG. 1.

Referring now to FIG. 4, a plurality of sets of tracks 92A-D may be attached to and directly beneath horizontal support member 22. Each set of tracks 92A-D is preferably adapted to receive corresponding pair of glides 96 (shown in FIGS. 2 and 3) so that glides 96 and coin bins 90A-D may be quickly attached to, detached from, and moved beneath horizontal support member 22. This removable and movable feature of coins bins 90A-B may be helpful in weighing and counting coins on a regular basis.

Each track 92A-D is preferably L-shaped having a vertical component and a horizontal component. Of course, each track may have other shapes known in the art. One end of the vertical component of each track is preferably attached to horizontal support member 22, and the other end is preferably attached to the horizontal component. The horizontal component of each track is preferably parallel to the plane of horizontal support member 22 and is adapted to facilitate the sliding movement of the coin bins (not shown in FIG. 3). One set of tracks 92A, 92B, 92C, or 92D may be provided for every coin bin (not shown in FIG. 3) gaming device base 20 is designed to accommodate. Most preferably, one coin bin is provided for every gaming device so that coins from gaming devices are not mixed. Thus, the number of sets of tracks may vary depending on the number of coin bins or the number of gaming devices gaming device base 20 is designed to accommodate.

In the preferred embodiment where coin bins may only be accessed from one side (preferably the front side) of gaming device base 20 (hereinafter referred to as the accessible side), the length of each set of tracks and each coin bin may be substantially half the width of horizontal support member 22. A first vertical partition 147 (not shown in FIG. 4 and further discussed below) may provide a stop for coin bins 90A-D and may further prevent coin bins 90A-D from further sliding toward the inside of gaming device base 20 and becoming detached from tracks 92. Thus, there are preferably no coin bins directly underneath gaming devices positioned on the other half of horizontal support member 22, preferably the rear or back side of gaming device base 20, which is hereinafter referred to as the inaccessible side. Coin bins for gaming devices that are positioned on the inaccessible side may be positioned on the accessible side and may be provided with chutes 100A-B so that coins being dropped from the gaming devices are directed to their corresponding coin bins. Chutes 100A-B preferably has a flat surface attached to horizontal support member 22 in a diagonal position relative to horizontal support member 22. Chutes 100A-B may further have sidewalls perpendicular to the flat surface and to the horizontal support member to provide a barrier for the coins being dropped from a gaming device to a corresponding coin bin. Chutes 100A-B is preferably made of galvanized metal, but other materials known in the art may be used, such as plastic or wood.

An elongated wire chase 102 may be attached to horizontal support member 22 directly underneath wire passages 52, 54, 56, and 58 (shown in FIG. 1) and substantially between each set of tracks 92A-D and chutes 100A-B. Wire chase 102 may have a concave cross sectional shape to accommodate wires. A portion of chute 100A-B may overlap an exterior bottom portion of wire chase 102. Wire chase 102 may be adapted to receive electrical wires from gaming devices 32, 34, 36, and 38 and wire passages 52, 54, 56, and 58 (shown in FIG. 1). Wire chase 58 is further adapted to isolate electrical wires from coins being dropped to coin bins 90A-D (shown in FIGS. 2 and 3). Wire chase 58 is preferably made of galvanized steel, but other materials known in the art may be used, such as plastic, rubber, or polyvinyl chloride.

Figure 5:
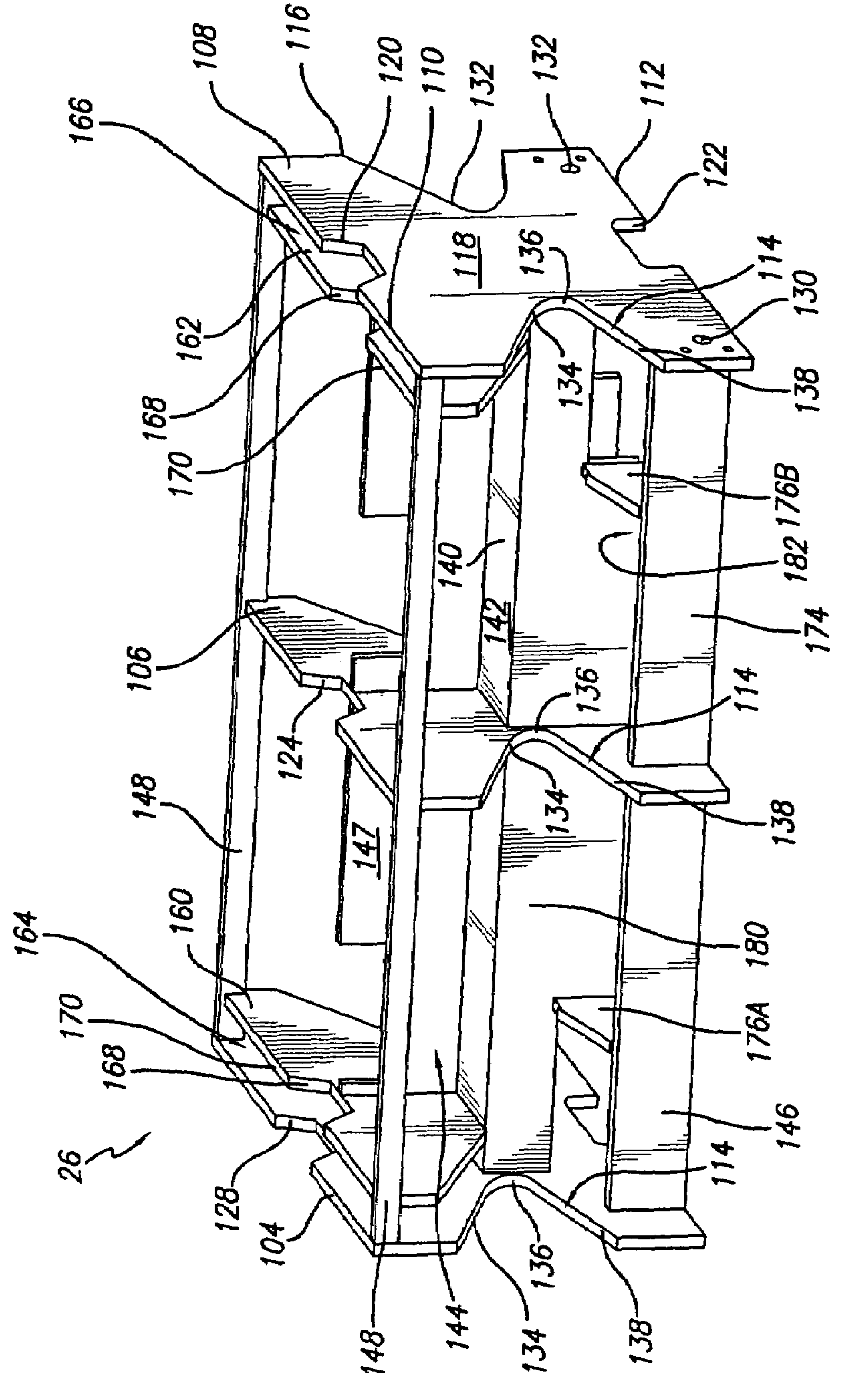
FIG. 5 is substantially a perspective view of the support structure of the gaming device base of FIG. 1.

Referring now to FIGS. 5 and 6, a preferred embodiment of support structure 26 adapted to support horizontal support member 22 from a floor is shown. Support structure 26 preferably has three vertical members 104, 106, and 108 perpendicularly attached to horizontal support member 22 (not shown in FIG. 5). Vertical members 104, 106, and 108 are preferably attached to side edge 76, a middle portion, and side edge 78 of horizontal support member 22 (seen in FIG. 1). Of course, the number of vertical members and their positions relative to horizontal support member 22 may vary.

Each vertical member 104, 106, and 108 is preferably made of a flat piece of material having a surface 118 and a top 110, bottom 112, front 114, and back 116 edges surrounding surface 118. Top edge 116 preferably defines a recess 120, 124, and 128 to accommodate wire chase 102 (not shown in FIG. 5) or electrical wires. Bottom edge 112 may also define a recess 122 to allow wires stored within the confines of gaming device base 20 to exit and preferably to run to another gaming device base 20 (not shown). Surface 118 may define at least one passage 130 and 132 to allow wires stored within the confines of gaming device base 20 to exit and preferably to run to another gaming device base 20 (not shown).

Each front 114 and back 116 edge preferably has a top portion, which further has a recess 134 that substantially follows the shape of door 24 in a closed position described above and seen in FIG. 1. Each front 114 and back 116 edge may have a middle portion 136 that is substantially parallel to a vertical plane. Each front 114 and back 116 edge may further have a bottom portion forming a leg 138 extending forward and toward the front of a gaming device. Of course, the shapes and sizes of vertical members 104, 106, and 108 may vary.

Support structure 26 may further include at least one horizontal partition 140. Horizontal partition 140 is preferably a flat rectangular piece of material having a surface 142. Horizontal partition 140 may be disposed horizontally in between vertical members 104 and 108 and across vertical member 106. Horizontal support member 22 and horizontal partition 140 may define a first compartment 144, preferably reserved for coin bins. Vertical member 104 preferably divides compartment 144 into a left side sub-compartment and a right side sub-compartment. A first vertical partition 147 may be positioned transverse from horizontal partition 140 and perpendicular to vertical member 104. First vertical partition 147 further divides compartment 144 into a front sub-compartment and a rear sub-compartment. First vertical partition 147 further provides a stop for coin bins 90A-D (not shown in FIG. 5) and prevents coin bins 90A-D from further sliding toward the inside of gaming device base 20 and becoming detached from tracks 92 (not shown in FIG. 5). First vertical partition 147 may further include recesses for allowing chute 100 (not shown in FIG. 5) to extend from horizontal support member 22 to a coin bin 90A, 90B, 90C, or 90D.

Support structure 26 may further have a second vertical partition 180. In the most preferred embodiment, second vertical partition 180 is positioned in front of and below horizontal partition 140, in between vertical members 104 and 108, across vertical member 106, and at a height substantially equal to the height of middle portion 136 of front edges 114 of vertical members 104, 106, and 108. Support structure 26 may further include at least one board 174 attached to the legs 138 of vertical members 104, 106, and 108. Board 174 is preferably a flat piece of rectangular galvanized steel positioned in between vertical members 104 and 108 and across vertical member 106. Board 174 may also be made triple-enforced wood with PVC face, non-galvanized steel, aluminum, and other materials known in the art. Second vertical partition 180, a second horizontal partition adjacent to the floor (not shown), and board 174 may define a compartment 182. Compartment 182 is preferably reserved for storage of coins and most preferably for awarding a jackpot winner. Compartment 182 may further be reserved for storing electrical wires. Compartment 182 may be divided into a left side sub-compartment and a right side sub-compartment by leg 138 of vertical member 106. Third vertical partitions 176A and 176B may further be positioned perpendicular to board 174 and in between board 174 and second vertical partition 180. Third vertical partitions 176A and 176B may further divide compartment 182 into four compartments arranged side-by-side.

Referring now to FIGS. 6 and 7, door 24 may be attached on horizontal partition 140 by a hinge, preferably by a continuous piano hinge. A footrest plate 178 may be preferably attached to second vertical partition 180. Footrest plate 178 is preferably attached to second vertical partition 180 by a continuous hinge to allow footrest plate to swing up and down. Footrest plate 178 preferably moves from an open position to a closed position to provide access to compartment 182 (shown in FIG. 5) or sub-compartments of compartment 182. In the closed position, footrest plate 178 is preferably in a substantially horizontal position or diagonal position and resting upon board 174. In the open position, a stand 192 may be provided to support plate 178 in the open position. Stand 192 may be attached to partitions defining compartment 182. Most preferably, stand 192 is moveable from a substantially horizontal position when plate 178 is in a closed position to a substantially transverse position when plate 178 is in an open position. Plate 178 may be made of metal, galvanized steel, non-galvanized steel, wood, or other materials known in the art. Plate 178 may further be covered with carpet, or other materials that would protect plate 178 from scratches or provide plate 178 with additional appeal.

A plate extension 186 may be attached substantially perpendicular to footrest plate 178 to firmly engage footrest plate 178 to board 174 when in the closed position. A lock 188 may be attached to plate extension 186 so that footrest plate 178 may be lockable when in the closed position. Lock 188 may be a plunger-type lock or a deadbolt lock, but may be made of locks known in the art. A security sensor 190 may further be provided to monitor the opening and closing of footrest plate 178 or to control the access to compartment 182. Sensor 190 may be optical sensors, or other sensors known in the art. In the most preferred embodiment, a plate edge cover 190 is positioned on the front edge of footrest plate 178. Plate edge cover 190 protects footrests 28 and 30 from wear and scratches. Plate edge cover 190 is preferably made of metal, but may be made of plastic, fiberglass, acrylic, powder coating, and other materials known in the art.

Support structure 26 may also comprise additional components that further strengthen support structure 26 in supporting the weight of gaming devices, such as brackets, braces, and the like. Support structure 26 is preferably made of wood, but may be made of other materials, such as steel, aluminum, and the like. The number and shapes of partitions may vary.

Referring back to FIG. 5, gaming device base 20 may further have at least one, preferably two, vertical wire partition 160 and 162. Each vertical wire partition is preferably a flat piece of material having a surface surrounded by top, bottom, front, and back edges. Top edge 170 may define a recess 168 to accommodate wire chase 102 (shown in FIG. 4). Outer surface of vertical wire partition 160 and vertical member 104 define a gap 164 in between them. Electrical wires run through wire chase 102 (shown in FIG. 4) then through gap 164. Outer surface of vertical wire partition 162 and vertical member 108 define a gap 166 in between them. Electrical wires run through wire chase 102 (shown in FIG. 4) then through gap 166. A bottom wire chase 172 (shown in FIG. 6) extending through almost the entire length of board 174 may be provided to receive the wires coming from gaps 164 and 166. Of course, the number of bottom wire chases may vary. Bottom wire chase 172 may be made similar to wire chase 102, but may of different dimensions than wire chase 102.

With continued reference to FIG. 5, vertical wire partitions 160 and 162 and vertical member 106 may define a notch (not shown in FIG. 5) at their respective front and back edges. Each notch may be adapted to receive and support a beam 148. Beam 148 may be provided in front of gaming device base 20 beneath front edge 70 of horizontal support member 22 and at the back of gaming device base 20 beneath back edge 72 of horizontal support member 22. Beam 148 is adapted to add strength to horizontal support member 22 in supporting the weight of gaming devices 32, 34, 36, and 38 (shown in FIG. 1). Beam 148 is preferably made of heavy gauged steel tube, but other materials known in the art may be used. Beam 148 may further be in the form of a shaft, a C-channel, a rod, and other structures and shapes known in the art. Beam 148 may be adapted to receive locking portion (not shown) of door lock 86 (shown in FIG. 1). It is noted that beam 148 may provide door 24 with a sturdy locking mechanism that may be difficult to tamper with, as the locking portion engages to a metal.

In another embodiment (not shown), a second horizontal partition may be provided beneath first horizontal partition 140. First horizontal partition 140 and second horizontal partition may define a second compartment. First horizontal partition 140 and second horizontal partition may further define wire holes for securing and isolating electrical wires. The second compartment may be reserved for storing pre-counted currency to be awarded to a player, a jackpot winner, or for some other purpose. Second compartment may further comprise second compartment doors. Boxes or drawers may also be disposed within the second compartment. Additional horizontal partitions may be added to define additional compartments (not shown). Additional horizontal shelves or vertical compartment partitions may also be provided.

In another alternative embodiment (not shown), gaming device base 20 has only one horizontal partition similar to horizontal partition 140. Underneath the horizontal partition is preferably a panel attached to support structure 26 at an acute angle measured from the horizontal partition. The panel may have a reflective surface to reflect light and to add appeal to gaming device base 20. The panel may be made of wood with laminate, durable carpet, or rubber flooring sheet surface. The panel may also be a metallic sheet, such as stainless steel or aluminum. A low-voltage rope lighting or other alternative lighting may be added below the horizontal partition to add attraction to gaming device base 20.

CONCLUSION

It can thus be seen that with certain embodiments of the present invention, a player who is sitting in front of a gaming device positioned on top of a gaming device base may stretch his or her legs behind an edge of the gaming device base. The player may further rest a foot on a footrest. Therefore, player can sit comfortably in front of the gaming device supported by the gaming device base. The player is therefore more likely to spend more time sitting in front of the gaming device and playing the gaming device. As a result, game operators are likely to gain more revenue with using the gaming device base.

Certain embodiments of the present invention further provide a gaming device base having a horizontal support member capable of supporting the weight of a gaming device positioned thereon with minimal tendency of bending or warping. Moreover, certain embodiments of the present invention allow gaming employees, who routinely lift coin buckets for weighing and counting coins, to lift the coin bucket from an elevated position thereby reducing the risk of back injuries to the employees.

Certain embodiments of the present invention minimize the possibility of coins being deflected by wires away from coin bins or the possibility of coins going inside a group of wires. It can also be appreciated that certain embodiments provide discreet locations for electrical wires, and, at the same time, maintain accessibility of the wires.

Although the description above contains many specifications, these should not be construed as limiting the scope of the invention but as merely providing illustrations of some of presently preferred embodiments of this invention. Thus, the scope of the invention should be determined by the issued claims and their legal equivalents rather than by the examples given.

What is claimed is:

1. A gaming device base, comprising:

(A) a horizontal support member, the horizontal support member being capable of supporting at least one gaming device; and (B) at least one support structure adapted to support the horizontal support member from a floor, the support structure comprising an upper angled portion and a lower angled portion, the lower angled portion forming a footrest, the footrest further comprising at least a portion of at least one compartment, wherein the upper angled portion comprises a door having an open position and a closed position, and wherein the door is configured to drop down from the upper angled portion to be in the open position to allow access to a compartment formed at least in part by the upper angled portion.

2. The gaming device base of claim 1 wherein both the upper and lower angled portions are acutely angled relative to a vertical plane to allow a player to place at least a portion of one leg behind an edge of the horizontal support member.

3. The gaming device base of claim 1 further comprising at least a security device to control access to the compartment.

4. The gaming device base of claim 1 wherein the horizontal support member supports a plurality of gaming devices with at least two of the gaming devices having a back to back orientation.

5. The gaming device base of claim 1 wherein the footrest further comprises of at least one plate defined to allow access to the compartment.

6. The gaming device base of claim 5 wherein a portion of the plate can support at least one foot of at least one player who is located proximate to the support structure.

7. The gaming device base of claim 5 wherein the plate is moveably attached to the lower angled portion.

8. The gaming device base of claim 7 wherein the plate further has an open position and a closed position, the open position allowing access to the compartment.

9. The gaming device base of claim 8 wherein the plate is held in the open position by a stand movably connected to the compartment.

10. The gaming device base of claim 9, wherein the stand is adapted to move from a first position to a second position, wherein in the second position, the stand is substantially vertically oriented and capable of supporting the plate in the open position.

11. The gaming device base of claim 1 wherein the footrest further comprises of a footrest door which is configured to allow access to the compartment.

12. The gaming device base of claim 11 wherein the footrest door is moveably attached to the lower portion.

13. The gaming device base of claim 12 wherein moveably attached includes being hingedly attached.

14. A gaming device base, comprising:

(A) at least one horizontal support means for supporting a gaming device;

(B) at least support structure means for supporting a horizontal support means from a floor, wherein the support structure means comprises an upper angled portion and a lower angled portion, the upper angled portion further defining a compartment means for receiving items, the compartment means further defining an access means for allowing access to the compartment means, whereby a portion of the access means drops down from the upper angled portion to allow access to the compartment means; and (C) a footrest means for supporting a player's feet, wherein the means for supporting a player's feet defines at least a portion of a storage means for holding items.

15. The gaming device base of claim 14 wherein the footrest means further comprises an access means for accessing the storage means.

16. The gaming device base of claim 14 wherein the footrest means further comprises of a security means for controlling access to the storage means.

17. The gaming device base of claim 14 wherein the support structure means has an upper angled portion and lower angled portion, the upper angled portion further defines a compartment means for receiving items.

18. The gaming device base of claim 17 wherein the compartment means further defines access means for allowing access to the compartment means, whereby a portion of the access means drops down from the upper angled portion to allow access to the compartment means.

* * * * *

US007364160C1

(12) INTER PARTES REEXAMINATION CERTIFICATE (0199th)

United States Patent

Seelig et al.

(10) Number: US 7,364,160 C1

(45) Certificate Issued: Oct. 26, 2010

(54) GAMING DEVICE BASE

(75) Inventors: Jerald C. Seelig, Absecon, NJ (US); Mac Seelig, Absecon, NJ (US); Jack McNamara, Mount Laurel, NJ (US); Michael Kobryn, Philadephia, PA (US)

(73) Assignee: Wachovia Bank, National Association, Haddon Township, NJ (US)

Reexamination Request:

No. 95/000,421, Mar. 30, 2009

Reexamination Certificate for:

| | |
|---|---|
| Patent No.: | **7,364,160** |
| Issued: | **Apr. 29, 2008** |
| Appl. No.: | **11/012,986** |
| Filed: | **Dec. 14, 2004** |

Related U.S. Application Data

(63) Continuation of application No. 10/245,628, filed on Sep. 16, 2002, now Pat. No. 6,880,825.

(51) Int. Cl.

| | |
|---|---|
| ***A63F 13/08*** | (2006.01) |
| ***G07F 17/34*** | (2006.01) |

(52) U.S. Cl. ........................ 273/143 R; 273/309; 463/46

(58) Field of Classification Search ........................ None

See application file for complete search history.

(56) References Cited

U.S. PATENT DOCUMENTS

| | | | |
|---|---|---|---|
| 475,197 | A | 5/1892 | Carr |
| 5,416,666 | A | 5/1995 | Maguire |
| D472,939 | S | 4/2003 | Philpott |
| 6,637,844 | B1 | 10/2003 | Luciano, Jr. et al. |

FOREIGN PATENT DOCUMENTS

| | | |
|---|---|---|
| JP | H08-141202 | 6/1996 |

OTHER PUBLICATIONS

Nagasaki Ryoden, Nagasaki Ryoden Base Assembly Drawings, Oct. 24, 2000.

Cootamundra Components, Cootamundra Bases Brochure, Aug. 2001.

*Primary Examiner*—Beverly M. Flanagan

(57) ABSTRACT

A gaming device base having a front surface that allows players to extend their legs. In the preferred embodiment, the gaming device base has a horizontal support member having a substantially flat surface to support at least one gaming device and at least one edge. The gaming device base has at least one door positioned beneath the horizontal support member. The door may be moved from an open to a closed position. In the closed position, the door is positioned behind the edge of the horizontal support member. The door has at least one angled portion, which is an acute angle measured from a vertical plane. Players sitting in front of the edge of the horizontal support member may stretch or extend their legs behind the edge of the horizontal support member.

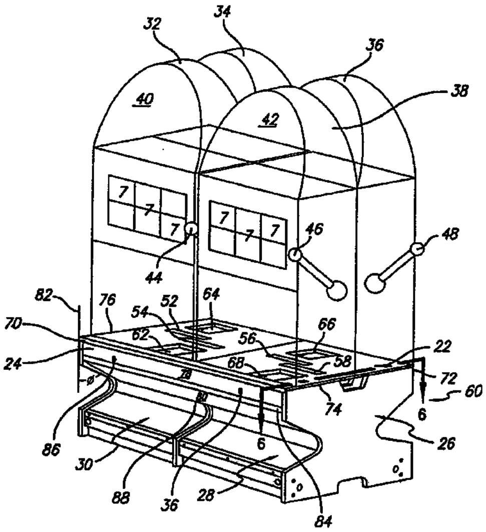

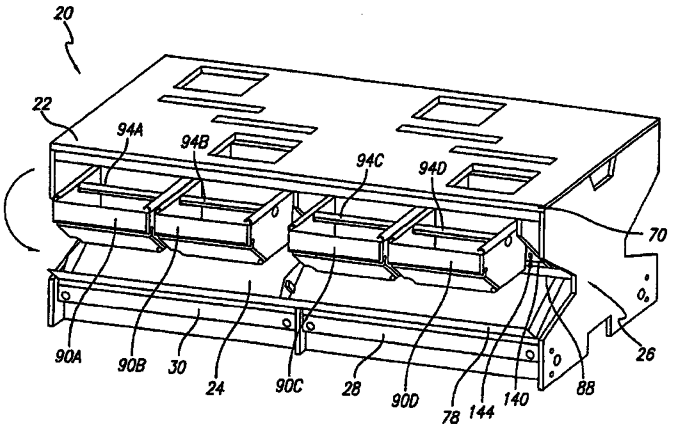

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-8 and 11-18 are cancelled.

Claims 9 and 10 were not reexamined.

* * * * *